United States Patent
Bell, III et al.

[11] Patent Number: 6,088,348
[45] Date of Patent: Jul. 11, 2000

[54] CONFIGURABLE SINGLE AND DUAL VCOS FOR DUAL- AND TRI-BAND WIRELESS COMMUNICATION SYSTEMS

[75] Inventors: John H. Bell, III, Poway; Ralph Kaufman, La Mesa, both of Calif.

[73] Assignee: Qualcom Incorporated, San Diego, Calif.

[21] Appl. No.: 09/255,028

[22] Filed: Feb. 22, 1999

Related U.S. Application Data

[60] Provisional application No. 60/092,565, Jul. 10, 1998.

[51] Int. Cl.[7] .................................................. H04Q 11/00
[52] U.S. Cl. .......................................... 370/343; 455/552
[58] Field of Search .................................. 370/319, 340, 370/344, 343; 455/314, 311, 259, 552, 260, 575; 375/346

[56] References Cited

U.S. PATENT DOCUMENTS

| | | | |
|---|---|---|---|
| 5,396,489 | 3/1995 | Harrison | 370/50 |
| 5,461,646 | 10/1995 | Anvari | 375/347 |
| 5,528,581 | 6/1996 | DeBot | 370/19 |
| 5,649,308 | 7/1997 | Andrews | 370/334 |
| 5,659,546 | 8/1997 | Elder | 370/343 |
| 5,715,235 | 2/1998 | Sawahashi et al. | 370/206 |
| 5,758,296 | 5/1998 | Nakamura | 455/575 |
| 5,878,087 | 3/1999 | Ichihara | 375/316 |
| 5,881,098 | 3/1999 | Tzuo | 375/206 |
| 5,889,759 | 3/1999 | McGibney | 370/207 |
| 5,898,740 | 4/1999 | Laakso et al. | 375/346 |
| 5,905,762 | 5/1999 | Stephens | 375/326 |

FOREIGN PATENT DOCUMENTS

| | | | |
|---|---|---|---|
| 0678974 | 10/1995 | European Pat. Off. | H03D 7/16 |
| 2312108 | 10/1997 | United Kingdom | H04B 1/26 |
| 9730523 | 8/1997 | WIPO | H04B 1/40 |
| 9844646 | 10/1998 | WIPO | H04B 1/18 |

*Primary Examiner*—Chau Nguyen
*Assistant Examiner*—Forood Boortalary
*Attorney, Agent, or Firm*—Philip Wadsworth; Charles D. Brown; Thomas R. Rouse

[57] ABSTRACT

A wireless communication with a receiver subsystem capable of supporting communications operating on two or three distinct frequency bands while incorporating only one or two oscillating devices, respectively. For example, such a subsystem could be integrated in a wireless communication hand-held device configured to operate within three frequency ranges in order to support Cellular, PCS, and GPS services. The receiver subsystem includes a receiver subsystem front end configured to receive first, second, and third receive signals operating under three different frequency bands. The three receive signals are subjected to front-stage filtering, low-noise amplifier, and bandpass filtering in order to remove any unwanted radio frequency components. The first signal is subsequently down-converted into an IF signal by mixing it with a first reference signal generated by a first voltage controlled oscillator (VCO). The first VCO operates with a frequency band that is broader than necessary and generates the first reference signal with a predetermined frequency such that the mixing operation produces a specific common IF frequency. The second signal and third signals are similarly down-converted to a second common IF signal by mixing it with a second reference signal generated by a second voltage controlled oscillator (VCO). The present invention also includes a VCO feedback control loop, including a phased-lock-loop, for maintaining the accuracy and stability of the frequency signals produced by the first and second VCOs.

17 Claims, 6 Drawing Sheets

CONFIGURABLE SINGLE AND DUAL VCOS FOR DUAL- AND TRI-BAND WIRELESS COMMUNICATION SYSTEMS

CROSS-REFERENCE TO RELATED APPLICATION

This application claims the benefit of U.S. Provisional Patent Application No. 60/092,565 filed Jul. 10, 1998, where this Provisional application is incorporated herein by reference.

BACKGROUND OF THE INVENTION

1. Field of the Invention

This invention generally relates to wireless communications. More particularly, the present invention relates to a novel and improved wireless communication system and method capable of supporting communications in any of two or three distinct frequency bands.

2. Description of Related Art

Wireless communication devices sometimes include dual-band transmitters/receivers so that they can be used with various communication services operating on two distinct frequency bands. For example, older analog cellular systems, conforming to the Advanced Mobile Phone Service (AMPS) standard, utilize frequency-modulation and operate in a frequency range of approximately 869.04–893.97 MHz. In contrast, more advanced digital systems, such as Personal Communication Systems (PCS), employ phase-modulation schemes operating in a frequency bandwidth of 1930–1990 MHz frequency bandwidth. As shown in FIG. 1, these services, and their associated frequency bands, can be accommodated by a single communication receiver infrastructure.

FIG. 1 depicts the architecture of the receiver subsystem 100 operating in a dual-band wireless communication system. Suppose, for example, that the two bands comprise Cellular and PCS services. The initial RF stage for receiver subsystem 100 includes an antenna for each of the two bands. The Cellular services antenna 110 is properly matched to operate in the 869.04–893.97 MHz frequency band, while the CS antenna 130 operates in the 1930–1990 MHz band. Antennas 110, 130 are coupled to RF front-end bandpass filters 112, 132, respectively, in order to minimize out-of-band energy contributions on the received Cellular and PCS signals. The respective outputs of front-end bandpass filters 112, 132 are coupled to Low-Noise Amplifiers (LNAs) 114, 134, so as to maintain the signal-to-noise ratio of the received Cellular and PCS signals. LNAs 114, 134 are coupled to bandpass filters 116, 136, respectively, to further remove unwanted energy on the received Cellular and PCS signals. The bandpass filters 114, 134 then attach to frequency mixers 118, 138, respectively, in order to down-convert the received Cellular and PCS signals from RF signals to IF signals.

The down-conversion process translates the frequencies of the received signals to lower IF frequencies so as to reduce the operating frequency of the receiver subsystem 100 and improve its performance. Generally, the down-conversion process mixes (i.e. multiplies) the received signal with a local reference signal having a frequency supplied by a phase-locked loop (PLL) having a local voltage-controlled oscillator (VCO). The PLL ensures a precise mixer frequency. The VCO frequency is chosen such that the mixing of the received and reference signals yields a desired reduced frequency component within the IF range.

In this case, the down-conversion employs VCOs 154, 158 to supply reference frequency signals with bandwidths corresponding to the received Cellular and PCS signal bandwidths. For example, VCO 154, generates a frequency signal at a bandwidth of 954.42–979.35 MHz and is mixed with the received Cellular signal which, after passing through a low-pass filter 120, renders a Cellular common IF signal operating at a resultant frequency of 85.38 MHz. Similarly, VCO 158, generates a frequency signal at a bandwidth of 1719.62–1779.62 MHz which mixes with the received PCS signal and, after low-pass filtering 140, produces a PCS common IF signal at 210.38 MHz.

It is important to note that, in order to operate the wireless communication system in dual-band, the conventional receiver subsystem 100 must include two VCOs (e.g., 154, 158), where each VCO is tuned to a band of frequencies corresponding to each band. In addition, two distinct common IF frequencies are generated, requiring different post receiver subsystem processing for each common IF.

With the advent of the Global Positioning System (GPS) it has become desirable to integrate a GPS receiver into a hand-held wireless communication device so that it can automatically send to a base station data indicating the location of the hand held device. To support GPS services, however, conventional wireless communication systems, operating in dual-band, have to convert to a tri-band operation in order accommodate the additional frequency band germane to GPS applications.

For example, the front-end of the conventional receiver subsystem 200 employs antenna 210 capable of receiving Cellular frequencies at 869.04–893.97 MHz, antenna 230 capable of receiving PCS frequencies at 1930–1990 MHz, and antenna 250 capable of receiving GPS frequencies at PCS frequencies at 1575.42 MHz. The received signals are front-stage filtered (i.e., 212, 232, 252), low noise amplified (i.e., 214, 234, 254), band-pass filtered (i.e., 216, 236, 256), and mixed (i.e., 218, 238, 258) in a manner similar to the conventional systems of FIG. 1.

With respect to the Cellular received signals, VCO 274 is configured to supply a reference signal with a frequency sub-band of 954.42–979.35 MHz to mixer 218 in order to down-convert the received Cellular signal to the common IF frequency of 85.38 MHz.

With respect to the PCS received signals, VCO 278 is configured to supply a reference signal with a frequency sub-band of 1719.62–1779.62 MHz to mixer 238 in order to down-convert the received PCS signal to the common IF frequency of 210.38 MHz.

With respect to the received GPS signal, VCO 282 is configured to generate a reference signal with a frequency of 1530.42 MHz which is supplied to mixer 258 to down-convert the received GPS signal to the common IF frequency of 45 MHz.

Such systems would have to, therefore, include three oscillators, each operating at a specific band that corresponds to a particular service. That is, a tri-band communication system must incorporate a first VCO (218), for accommodating the bandwidth for Cellular services and the generation of a Cellular common IF of 85.38 MHz; a second VCO (238), for accommodating the bandwidth for PCS services and the generation of a PCS common IF of 210.38 MHz; and a third VCO for accommodating the bandwidth for GPS services and the generation of a GPS common IF of 45.0 MHz.

As shown in the conventional dual-band and tri-band systems of FIGS. 1 and 2, the VCO frequency bands correlate to the operating frequency band of each service. With this said, we note that VCOs are neither one-size-fits-all nor interchangeable. Thus, wireless communication devices designed to operate with these services, such as telephonic equipment, require a different VCO in their receiver subsystem for each band of service subscribed to. In particular, wireless phones having tri-band capabilities, such as Cellular, PCS, and GPS would require three VCOs, one for each service. Clearly, it is both, inefficient and cumbersome to incorporate a separate VCO and associated PLL circuit for each desired wireless communication service. Moreover, it is equally inefficient and awkward to process a distinct common IF frequency for each service. This is especially crucial given the design limitations on wireless phones (i.e., size, weight, etc.), where such inefficiencies can directly translate into increased circuit complexity.

For the foregoing reasons, a need exists for a system and method that effectively supports wireless communications operating on two or three distinct frequency bands while only utilizing one or two oscillating devices, respectively.

SUMMARY OF THE INVENTION

The present invention addresses the need identified above by providing a system and method that supports wireless communications operating on two or three distinct frequency bands while utilizing only one or two oscillating devices. Such a system would enhance the communication capabilities while simplifying the prior art circuitry and greatly reducing processing complexity.

Systems and methods, consistent with the principles of the present invention as broadly described in a first embodiment herein, include a receiver front-end having antenna apparatus for receiving a first and second receive signal, each receive signal operating under a different frequency band, such as, for example, a PCS and a GPS signal. Both receive signals are subjected to front-stage filtering, low noise amplification, and bandpass filtering in order to remove any unwanted radio frequency components.

The first signal is subsequently down-converted into a specific common IF signal by mixing it with a first reference signal generated by a first voltage controlled oscillator (VCO). The second receive signal is similarly and uniquely down-converted to the same IF frequency by mixing it with a second reference signal generated by a second voltage controlled oscillator (VCO). The second VCO typically operates with a frequency band that is broader than necessary and generates the second reference signal with a second predetermined frequency such that the mixing operation produces the same common IF frequency as the first signal.

The first embodiment also provides a VCO feedback control loop, including a phased-lock-loop, for each of the VCOs in order to maintain the accuracy and stability of the frequency signals produced by the VCOs.

A second embodiment of the present invention comprises similar components responsive to a first and second receive signal, such as, for example, a Cellular and GPS signal, wherein the first receive signal operates under a different frequency band than the first receive signal of the first embodiment. The two VCOs produce frequency reference signals that are different than the first embodiment and are mixed with the respective first and second receive signals to generate a specific common IF frequency which is different than the first embodiment.

A third embodiment comprises a similar receiver front-end as the first embodiment and includes antenna apparatus for receiving a first and second receive signal, each receive signal operating under a different frequency band, such as, for example, a PCS and a GPS signal. Both receive signals are subjected to front-stage filtering, low noise amplification, and bandpass filtering in order to remove any unwanted radio frequency components.

The first signal is subsequently down-converted into a common IF signal by mixing it with a first reference signal generated by a voltage controlled oscillator (VCO). The VCO operates with a frequency band that is broader than necessary and generates the first reference signal with a first predetermined frequency such that the mixing operation produces a specific common IF frequency. The second receive signal is similarly and uniquely down-converted to the same IF frequency by mixing it with a second reference signal generated by the same voltage controlled oscillator (VCO).

A fourth embodiment of the present invention comprises a receiver front-end having antenna apparatus for receiving a first, second, and third receive signals, each receive signal operating under a different frequency band. The three receive signals are subjected to front-stage filtering, low noise amplification, and bandpass filtering in order to remove any unwanted radio frequency components.

The first signal is subsequently down-converted into an IF signal by mixing it with a first reference signal generated by a first voltage controlled oscillator (VCO). The first VCO operates with a frequency band that is broader than necessary and generates the first reference signal with a predetermined frequency such that the mixing operation produces a specific IF frequency. The second signal is similarly down-converted to a common IF signal by mixing it with a second reference signal generated by a second voltage controlled oscillator (VCO). The second VCO operates with a frequency band that is also broader than necessary and generates the second reference signal with a predetermined frequency such that the mixing operation produces a second specific IF frequency. This same second reference signal is mixed with the third signal to produce an identical second specific common IF frequency.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings.

DETAILED DESCRIPTION OF THE PREFERRED EMBODIMENTS

The following detailed description of the present invention refers to the accompanying drawings that illustrate preferred embodiments consistent with this invention. Other embodiments are possible and modifications may be made to the embodiments without departing from the spirit and scope of the invention. Therefore, the following detailed description is not meant to limit the invention. Rather the scope of the invention is defined by the appended claims.

I. First Embodiment

Figure 1:
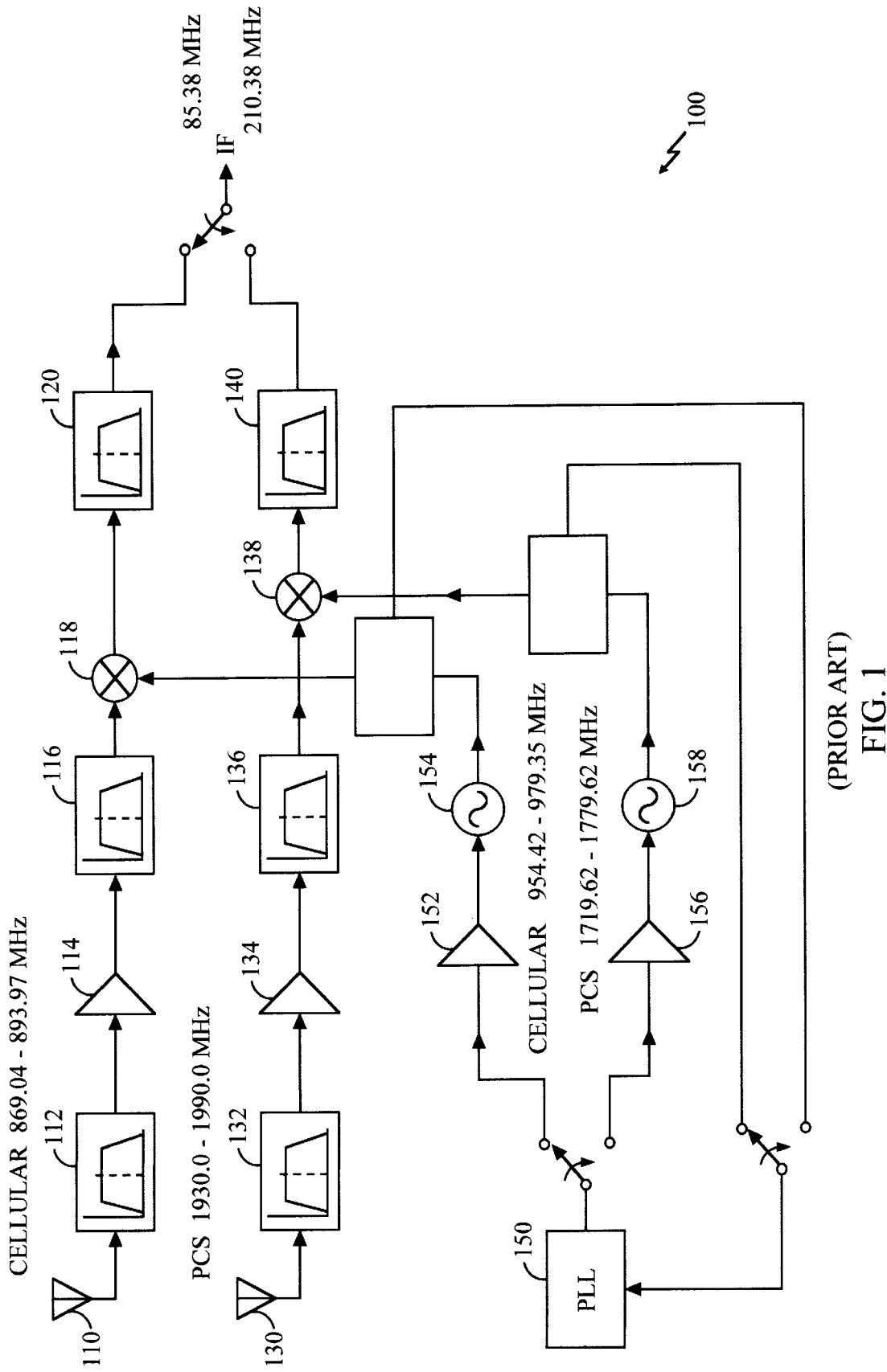
FIG. 1 (PRIOR ART) is a functional block diagram depicting the main components of a conventional dual-band wireless communication receiver subsystem.
Figure 2:
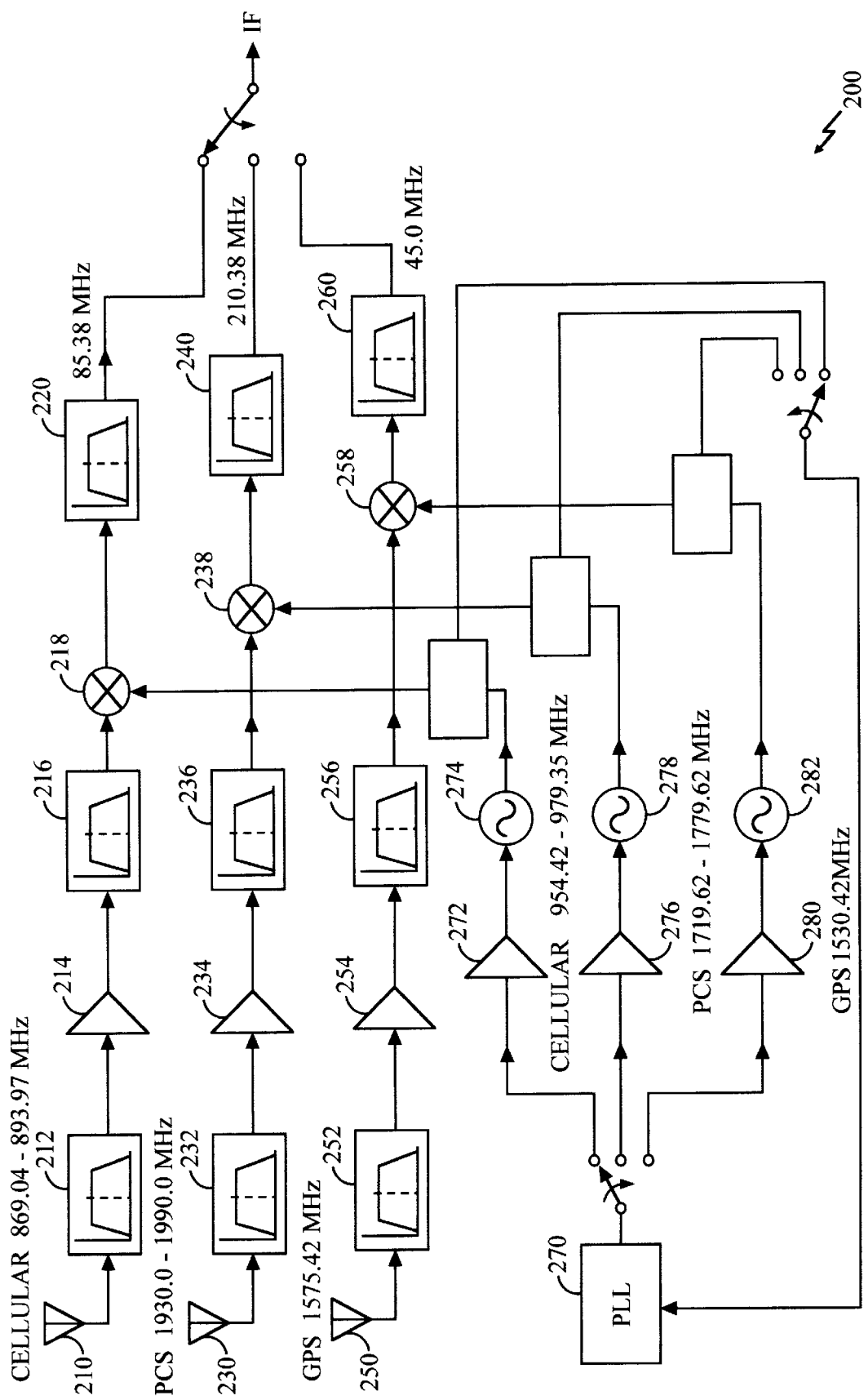
FIG. 2 (PRIOR ART) is a functional block diagram depicting the main components of a conventional tri-band wireless communication receiver subsystem.
Figure 3:
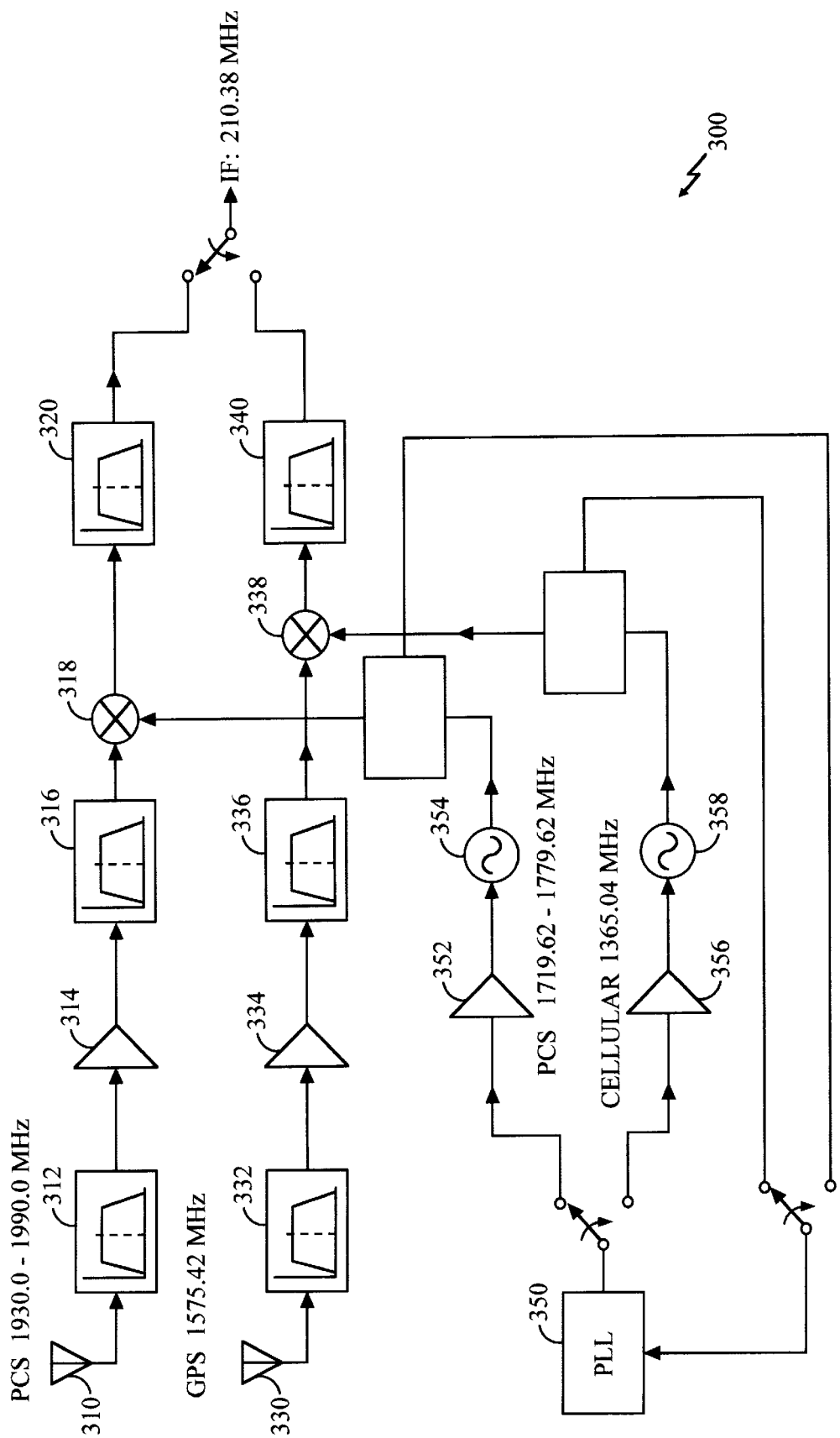
FIG. 3 is a functional block diagram depicting the main components of a dualband wireless communication receiver subsystem constituting a first embodiment of the present invention.

FIG. 3 illustrates a receiver of a wireless communication system in accordance with a first embodiment of the present invention. The front-end of receiver subsystem 300 employs antenna 310 capable of receiving PCS frequencies at 1930–1990 MHz and antenna 330 capable of receiving GPS frequencies at 1575.42 MHz. The received signals are front-stage filtered (i.e., 312, 332), low noise amplified (i.e., 314, 334), band-pass filtered (i.e., 316, 336), and mixed (i.e., 318, 338) in a manner similar to the conventional systems of FIGS. 1 and 2.

With respect to the PCS received signals, VCO 354 is configured to supply a reference signal with a frequency sub-band of 1719.62–1779.62 MHz to mixer 318 in order to down-convert the received PCS signal to the common IF frequency of 210.38 MHz.

With respect to the received GPS signal, VCO 358 typically generates Cellular-type frequencies within the range of 954.42–979.35 MHz. It is uniquely configured, however, to generate a reference signal with a frequency of 1365.04 MHz which is supplied to mixer 338 to down-convert the received GPS signal to the same common IF frequency of 210.38 MHz as the PCS signal.

As such, this configuration employs a PCS VCO and a Cellular VCO to down-convert a PCS signal and a GPS signal to an identical single common IF frequency. Moreover, by reducing the number of down-converted frequencies to a single common IF frequency, the complexity of subsequent processing is also minimized. This receiver subsystem is, therefore, readily applicable to wireless communication devices, such as, for example, mobile phones, which subscribe to PCS and GPS services.

II. Second Embodiment

Figure 4:
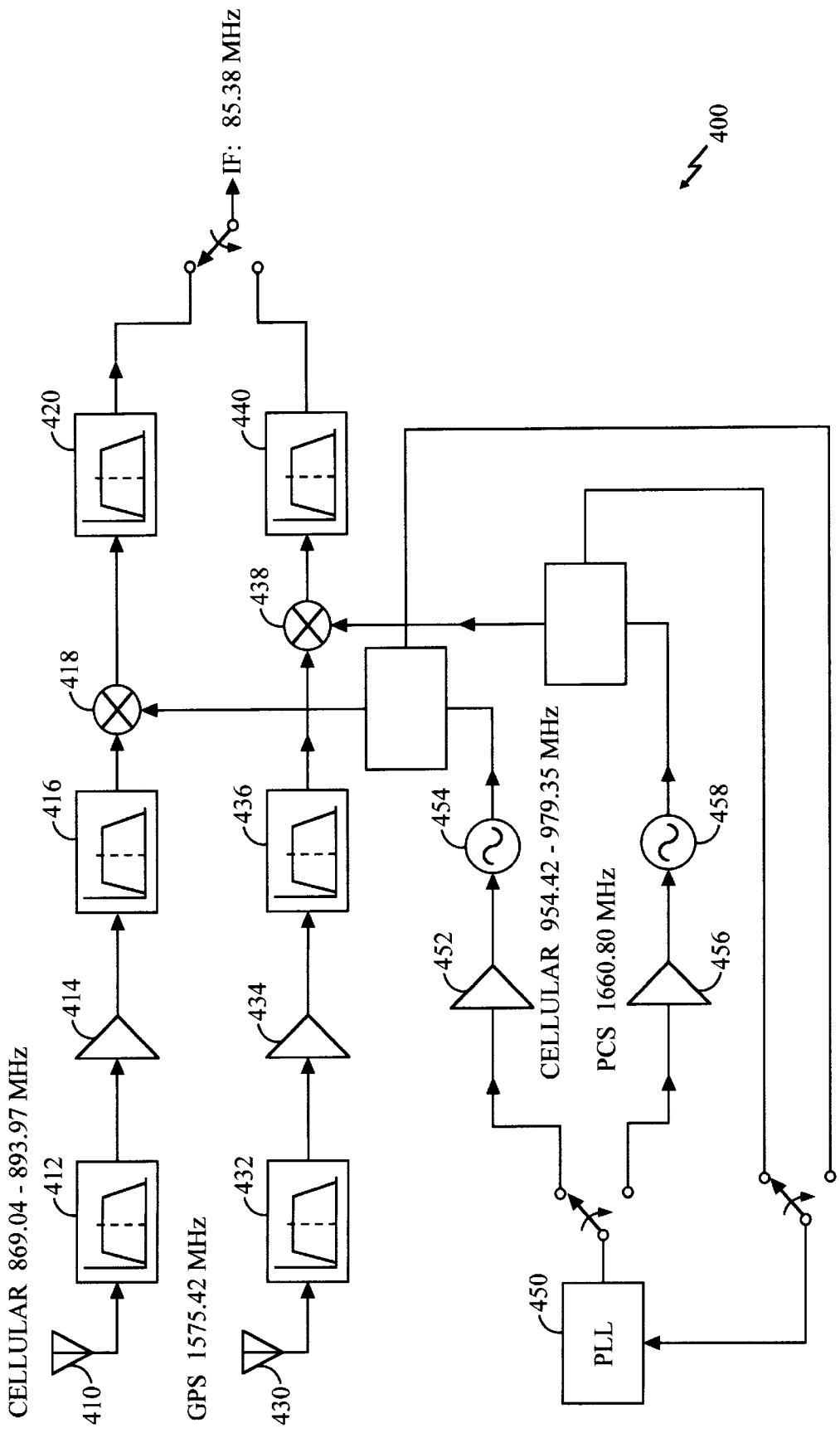
FIG. 4 is a functional block diagram depicting the main components of a dual-band wireless communication receiver subsystem constituting a second embodiment of the present invention.

FIG. 4 illustrates a receiver of a wireless communication system in accordance with a second embodiment of the present invention. The front-end of receiver subsystem 400 employs antenna 410 capable of receiving Cellular frequencies at 869.04–893.97 MHz and antenna 430 capable of receiving GPS frequencies at 1575.42 MHz. The received signals are front-stage filtered (i.e., 412, 432), low noise amplified (i.e., 414, 434), band-pass filtered (i.e., 416, 436), and mixed (i.e., 418, 438) in a manner similar to the conventional systems of FIGS. 1 and 2.

With respect to the Cellular received signals, VCO 454 is configured to supply a reference signal with a frequency band of 954.42–979.35 MHz to mixer 418 in order to down-convert the received Cellular signal to the common IF frequency of 85.38 MHz.

With respect to the received GPS signal, VCO 458 typically generates PCS-type frequencies within the range of 1719.62–1779.62 MHz. It is uniquely configured, however, to generate a reference signal with a frequency of 1660.80 MHz which is supplied to mixer 438 to down-convert the received GPS signal to the same common IF frequency of 85.38 MHz as the Cellular signal.

As such, this configuration employs a Cellular VCO and a PCS VCO to down-convert a Cellular signal and a GPS signal to an identical single common IF frequency. Moreover, by reducing the number of down-converted frequencies to a single common IF frequency, the complexity of subsequent processing is also minimized. This receiver subsystem is, therefore, readily applicable to wireless communication devices, such as, for example, mobile phones, which subscribe to Cellular and GPS services.

III. Third Embodiment

Figure 5:
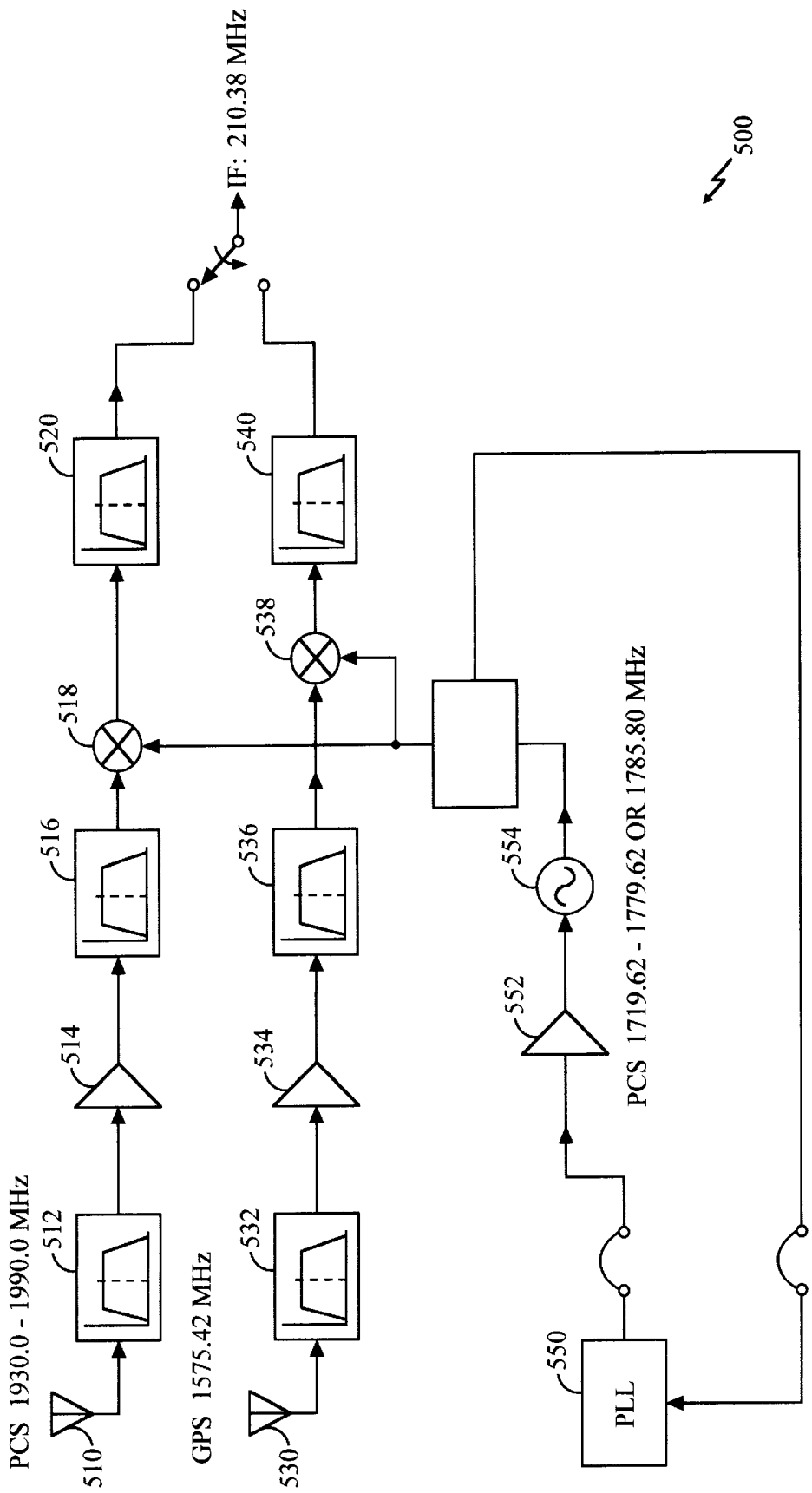
FIG. 5 is a functional block diagram depicting the main components of a dual-band wireless communication receiver subsystem constituting a third embodiment of the present invention.

FIG. 5 illustrates a receiver of a wireless communication system in accordance with a third embodiment of the present invention. The front-end of receiver subsystem 500 employs antenna 510 capable of receiving PCS frequencies at 1930–1990 MHz and antenna 530 capable of receiving GPS frequencies at PCS frequencies at 1575.42 MHz. The received signals are front-stage filtered (i.e., 512, 532), low noise amplified (i.e., 514, 534), band-pass filtered (i.e., 516, 536), and mixed (i.e., 518, 538) in a manner similar to the conventional systems of FIGS. 1 and 2.

With respect to the PCS received signals, VCO 554 is configured to supply a reference signal with a frequency sub-band of 1719.62–1779.62 MHz to mixer 518 in order to down-convert the received PCS signal to the common IF frequency of 210.38 MHz.

With respect to the received GPS signal, VCO 554 is uniquely configured to also generate a reference signal with a frequency of 1785.80 MHz which is supplied to mixer 538 to also down-convert the received GPS signal to the common IF frequency of 210.38 MHz as the PCS signal.

As such, this embodiment successfully employs a single VCO, used for PCS services, to down-convert both, a PCS and GPS received signal to an identical single common IF frequency. By incorporating a single, configurable, frequency-oscillating device with a frequency range that is broader than necessary, the receiver subsystem architecture, as shown in FIG. 5, is capable of processing two different services operating on two different frequency bands. By reducing the number of oscillators and associated circuitry, the subsystem's level of complexity is significantly reduced. Moreover, by reducing the number of down-converted frequencies to a single common IF frequency, the complexity of subsequent processing is also minimized. As such, this receiver subsystem is readily applicable to wireless communication devices, such as, for example, mobile phones, which subscribe to PCS and GPS services.

IV. Fourth Embodiment

Figure 6:
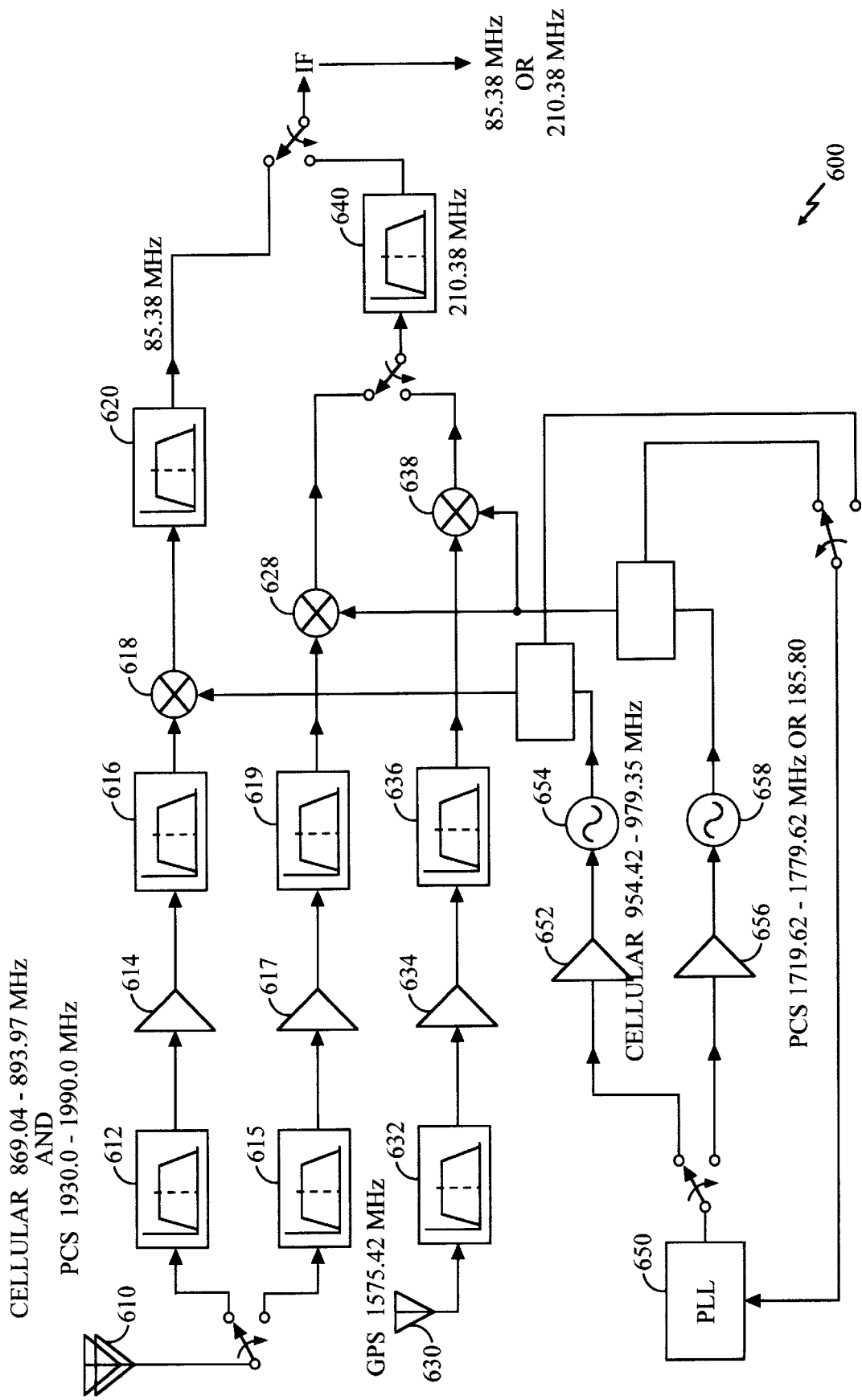
FIG. 6 is a block diagram depicting the main components of a tri-band wireless communication receiver subsystem constituting a fourth embodiment of the present invention.

FIG. 6 illustrates a receiver of a wireless communication system in accordance with a fourth embodiment of the present invention. The front-end of receiver subsystem 600 employs a dual-band antenna 610 capable of receiving Cellular frequencies at 894.04–893.97 MHz and PCS frequencies at 1930–1990 MHz as well as an antenna 630 configured to receive GPS frequencies at 1575.42 MHz. The received signals are front-end filtered (i.e., 612, 615, 632), low noise amplified (i.e., 614, 617, 634), band-pass filtered (i.e., 616, 619, 636), and mixed (i.e., 618, 628, 638) in a manner similar to the conventional systems of FIGS. 1 and 2.

With respect to the received Cellular signal, VCO 654 is configured to supply a reference signal with a typical frequency range of 954.42–979.35 MHz to mixer 618 in order to down-convert the received Cellular signal to the commonly used IF frequency of 85.38 MHz.

With respect to the PCS received signal, VCO 658 is configured to supply a reference signal with a typical frequency range of 1719.62–1779.62 MHz to mixer 628 in order to down-convert the received PCS signal to 210.38 MHz.

With respect to the received GPS signal, it is mixed with the PCS VCO 658 which is uniquely configured to supply a reference signal with a frequency of 1785.80 in addition to its typical frequency band of 1719.62–1779.62 MHz. The reference signal is then applied to mixer 638 to down-convert the received GPS signal into the same common 1 frequency of 210.38 MHz as the PCS signal.

This configuration, therefore, employs a PCS VCO and a Cellular VCO to down-convert a Cellular signal, a PCS signal, and a GPS signal into two distinct common IF frequencies. By incorporating two configurable frequency-oscillating devices, one having a frequency range that is broader than necessary, the receiver subsystem architecture, as shown in FIG. 6, is capable of processing three different services operating on three different frequency bands. By reducing the number of oscillators and associated circuitry, the subsystem's level of complexity is significantly reduced. Moreover, by reducing the number of down-converted frequencies to two common IF frequencies, the complexity of subsequent processing is also minimized. As such, this receiver subsystem is readily applicable to wireless communication devices, such as mobile phones, which subscribe to Cellular, PCS, and GPS services, for example.

What is claimed is:

1. A wireless communication system including a receiver subsystem capable of receiving radio signals with varying frequency ranges, said receiver subsystem comprising:
   a first receive signal operating within a desired first frequency range,
   a second receive signal operating within a desired second frequency range;
   at least one frequency oscillating device for generating a reference signal with a pre-selected local oscillator frequency;
   a first mixing device, responsive to said first receive signal and said reference signal, for producing a first converted signal at an intermediate frequency; and
   a second mixing device, responsive to said second receive signal and said reference signal, for producing a second converted signal at said intermediate frequency.

2. The wireless communication system set forth in claim 1, further including,
   a receiver subsystem front-end, including antenna apparatus, for receiving said first and second receive signals.

3. The wireless communication system set forth in claim 2, further including,
   a first front-stage filter, responsive to said first receive signal, for rejecting radio signals operating outside said desired first frequency range, and
   a second front-stage filter, responsive to said second receive signal, for rejecting radio signals operating outside said desired second frequency range.

4. The wireless communication system set forth in claim 3, further including,
   a first preamplifier device, coupled to said first front-stage filter, for amplifying said filtered first receive signal, and
   a second preamplifier device, coupled to said second front-stage filter, for amplifying said filtered second receive signal.

5. The wireless communication system set forth in claim 4, further including,
   a first bandpass filter, coupled to said first preamplifier device, for rejecting amplified radio signals operating outside said desired first frequency range, and
   a second bandpass filter, coupled to said second preamplifier device, for rejecting amplified radio signals operating outside said desired second frequency range.

6. The wireless communication system of claim 5, further including,
   a first second-stage filter, coupled to said first mixing device, for rejecting all signals other than those operating at said intermediate frequency,
   a second second-stage filter, coupled to said second mixing device, for rejecting all signals other than those operating at said intermediate frequency.

7. The wireless communication system set forth in claim 6, wherein said at least one frequency oscillating device comprises a first frequency oscillating device.

8. The wireless communication system set forth in claim 6, wherein said at least one frequency oscillating device comprises a first and second frequency oscillating device respectively having a first and second pre-selected local oscillator frequencies.

9. The wireless communication system set forth in claim 7, wherein said first frequency oscillating device is coupled to a feedback control loop, including a phased-lock-loop, in order to maintain the accuracy and stability of said pre-selected local oscillator frequency.

10. The wireless communication system set forth in claim 8, wherein said first and second frequency oscillating devices are coupled to a feedback control loop, including a phased-lock-loop, in order to maintain the accuracy and stability of said first and second pre-selected local oscillator frequencies.

11. A wireless communication system including a receiver subsystem capable of receiving radio signals with varying frequency ranges, said receiver subsystem comprising:
    a first receive signal operating within a desired first frequency range;
    a second receive signal operating within a desired second frequency range;
    a third receive signal operating within a desired third frequency range;
    a first frequency oscillating device, having a first local oscillator frequency range, for generating a first reference signal;
    a second frequency oscillating device, having a second local oscillator frequency range, for generating a second and a third reference signal;
    a first mixing device, responsive to said first receive signal and first reference signal, for producing a first converted signal at a first intermediate frequency;
    a second mixing device, responsive to said second receive signal and second reference signal, for producing a second converted signal at a second intermediate frequency; and
    a third mixing device, responsive to said third receive signal and third reference signal, for producing a third converted signal at said second intermediate frequency.

12. The wireless communication system set forth in claim 11, further including,
    a receiver subsystem front-end, including antenna apparatus, for receiving said first, second, and third receive signals.

13. The wireless communication system set forth in claim 12, further including,
- a first front-stage filter, responsive to said first receive signal, for rejecting radio signals operating outside said desired first frequency range,
- a second front-stage filter, responsive to said second receive signal, for rejecting radio signals operating outside said desired second frequency range, and
- a third front-stage filter, responsive to said third receive signal, for rejecting radio signals operating outside said desired third frequency range.

14. The wireless communication system set forth in claim 13, further including,
- a first low-noise amplifier device, coupled to said first front-stage filter, for amplifying said filtered first receive signal,
- a second low-noise amplifier device, coupled to said second front-stage filter, for amplifying said filtered second receive signal, and
- a third low-noise amplifier device, coupled to said third front-stage filter, for amplifying said filtered third receive signal.

15. The wireless communication system set forth in claim 14, further including,
- a first bandpass filter, coupled to said first low-noise amplifier device, for rejecting amplified radio signals operating outside said desired first frequency range,
- a second bandpass filter, coupled to said second low-noise amplifier device, for rejecting amplified radio signals operating outside said desired second frequency range, and
- a third bandpass filter, coupled to said third low-noise amplifier device, for rejecting amplified radio signals operating outside said desired third frequency range.

16. The wireless communication system set forth in claim 15, wherein said first and second frequency oscillating devices are coupled to a feedback control loop, including a phased-lock-loop, in order to maintain the accuracy and stability of said first and second local oscillator frequencies.

17. The wireless communication system set forth in claim 16, further including,
- a first second-stage filter, coupled to said first mixing device, for rejecting all signals other than those operating at said first intermediate frequency,
- a second second-stage filter, coupled to said second and third mixing device, for rejecting all signals other than those operating at said second intermediate frequency.

* * * * *